United States Patent [19]

Okajima

[11] 4,029,498

[45] June 14, 1977

[54] PROCESS FOR TREATING MANGANESE NODULES

[75] Inventor: Yasuhiro Okajima, Ichikawa, Japan

[73] Assignee: Sumitomo Metal Mining Co., Limited, Tokyo, Japan

[22] Filed: May 8, 1975

[21] Appl. No.: 575,700

[30] Foreign Application Priority Data

May 23, 1974 Japan .................... 49-57278

[52] U.S. Cl. .................................. 75/103; 75/21; 75/80; 75/82; 75/117; 75/119; 75/121; 423/32; 423/50; 423/150; 423/144

[51] Int. Cl.² .................................. C22B 47/00

[58] Field of Search ............. 75/103, 21, 121, 119, 75/117, 80, 82; 423/32, 50, 150, 144

[56] References Cited

UNITED STATES PATENTS

| | | | |
|---|---|---|---|
| 2,928,732 | 3/1960 | Bare et al. | 75/119 |
| 3,342,547 | 9/1967 | Illis et al. | 423/144 |
| 3,728,105 | 4/1973 | Skarbo | 75/103 |
| 3,753,686 | 8/1973 | Wilder et al. | 75/21 |
| 3,810,827 | 4/1974 | Kane et al. | 75/121 X |
| 3,848,054 | 11/1974 | Wiewiorowski | 423/140 |
| 3,860,689 | 1/1975 | Sefton et al. | 423/150 |
| 3,869,360 | 3/1975 | Kane et al. | 75/119 X |
| 3,880,651 | 4/1975 | Queneau et al. | 75/82 |

Primary Examiner—G. Ozaki
Attorney, Agent, or Firm—Watson, Cole, Grindle & Watson

[57] ABSTRACT

In a process for treating manganese nodules wherein the nodules are reduced so as to convert most of the nickel, copper and cobalt impurities to their metallic state while inhibiting the conversion of the iron and manganese impurities to their metallic state, the resulting reduced ore is wet ground, if necessary, slurried and treated with an aqueous ammoniacal solution containing free oxygen to extract the metallic nickel, copper and cobalt as their ammine complexes. The iron and manganese are removed from the aqueous ammoniacal solution containing iron and manganese as impurities by leaching the slurry of reduced ore by adding sodium chloride or ammonium chloride thereto and blowing air in the leach solution which also contains sulfur dioxide.

14 Claims, 1 Drawing Figure

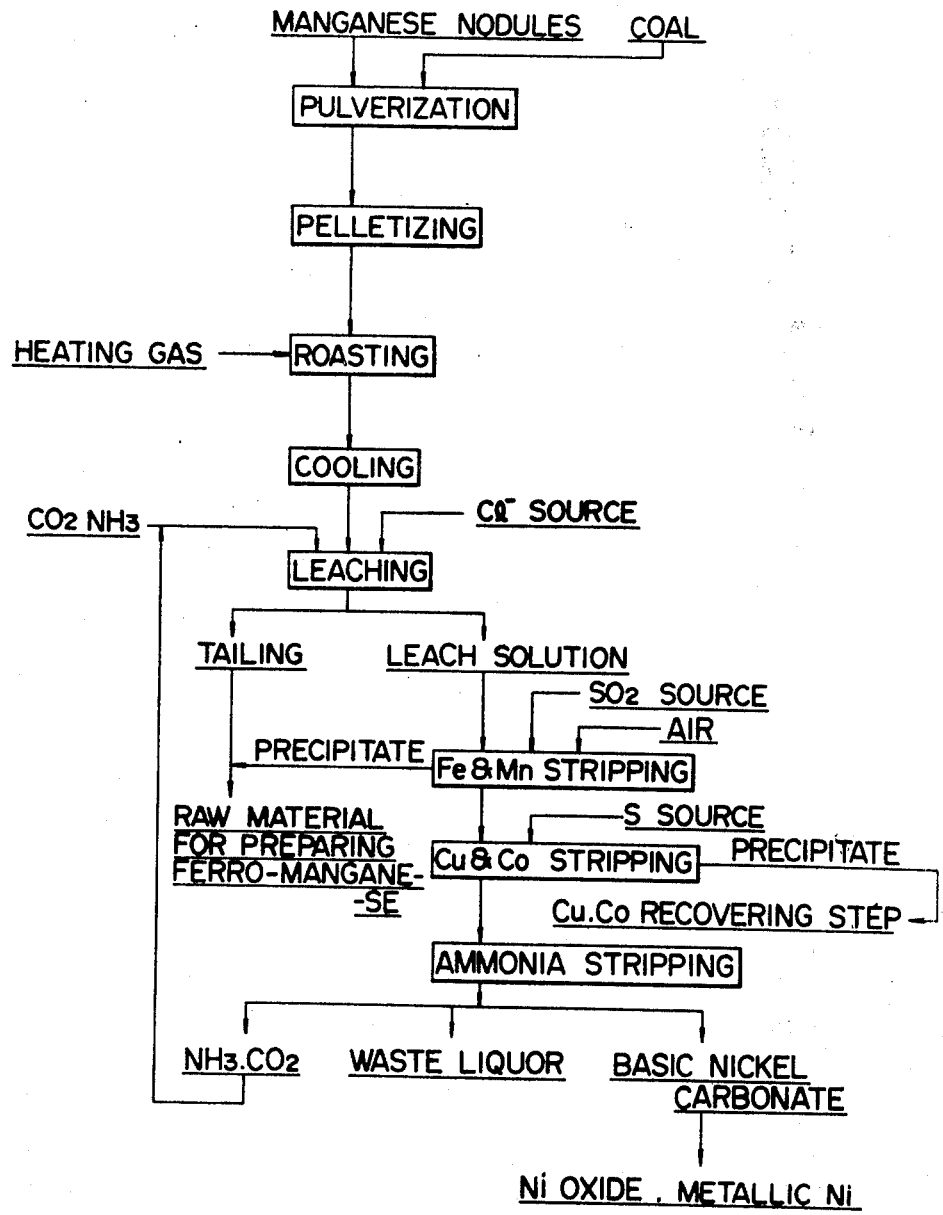

PROCESS FOR TREATING MANGANESE NODULES

BACKGROUND OF THE INVENTION

1. Field of the Invention

This invention relates to a process for obtaining valuable metals such as copper, nickel, cobalt and the like by selectively reductively roasting deep sea manganese nodules and extracting these metals with an aqueous ammoniacal solution and to a purification process for removing iron and manganese from the leach solution.

2. Description of Prior Art

Manganese nodules are distributed widely on deep sea bottoms at a depth of several thousand meters. They have granular, nodular or plate forms and contain manganese and iron as the main ingredients together with metals such as nickel, copper, cobalt and the like in the form of hydroxides. Manganese nodules are distributed widely on the bottom of the Pacific Ocean and the Atlantic Ocean. It has been estimated from data available at present that there are 1,700 billion tons of manganese nodules on the bottom of the Pacific Ocean which include nickel in an amount of 15 to 20 billion tons, copper in an amount of 7 to 10 billion tons and cobalt in an amount of 5 billion tons. The nodules are composed approximately, by weight, of 25% of Mn, 15% of Fe, 1% of Ni, 0.5% of Cu and 0.2% of Co.

The presence of manganese nodules has been known since the end of the 19th century but no attempt has been commercially made with respect to the recovery of the metals therefrom. Such manganese nodules are supposed to be a composite ore for which no known extractive metallurgy can be applied at present. An attempt to recover not only the manganese, but also the nickel, copper, cobalt and the like has been just begun, but there has been carried out no test on commercial scale nor development of any treatment for the manganese nodules which can recover all of the metal values therefrom.

Various processes have been studied for treating manganese nodules, including (1) leaching the ore directly with a mineral acid such as sulfuric acid or the like, (2) leaching the reduced ore with a mineral acid, (3) chloridizing volatilization, (4) segregation, (5) reductively smelting, and (6) extracting the reduced ore with an aqueous ammoniacal solution. However, there are many problems with such processes. For example, the process for leaching the reduced ore with an acid disadvantageously requires an increased amount of acid due to the dissolution of a large amount of manganese in the acid, and the separation of manganese from nickel and the like is difficult in the resulting aqueous solution. When the ore is melted, separation and recovery of nickel, cobalt and copper from the resulting crude metals is difficult. When the reduced ore is extracted with an aqueous ammoniacal solution, a large amount of manganese is dissolved in the leach solution and not only are there problems in separating manganese and iron from the aqueous solution, but the yields of nickel, copper and cobalt are not high.

It is thus an object of this invention to recover valuable metals such as nickel, copper, cobalt and the like and to recover a raw material for use in the preparation of ferromanganese from manganese nodules. It is another object to provide an extraction process wherein the efficiency is improved with respect to the extraction of reduced manganese nodules with an aqueous ammoniacal solution by reducing at least the nickel, cobalt and copper to the metallic state while selectively reductively roasting the nodules. It is a further object to provide a purification process for removing most of the iron and manganese solved in the leach solution to purify the aqueous ammoniacal solution. Other objects and features of this invention will be apparent from the following description.

SUMMARY OF THE INVENTION

According to the process of this invention, manganese nodules are reduced so that nickel, cobalt and copper are converted into their metallic state while manganese and iron are inhibited from being converted into their metallic state. Such reduction will be referred to hereinafter as "selective reduction."

In order to effect such selective reduction, manganese nodules are pulverized and the powder, or pellets or briquets formed therefrom are reduced by employing a reducing gas in a conventional manner. However, in order to inhibit the reduction of manganese and iron and to obtain nickel, copper and cobalt at high reduction efficiencies, the reduction is preferably carried out by the process as shown in the attached drawing, which is a flow chart of the process according to this invention for treating manganese nodules.

As shown in this flow chart, a carbonaceous reducing agent is added to the manganese nodules and the mixture pulverized to form a powder having a particle size of less than 20 mesh. The powder is shaped into pellets or briquets (referred to hereinafter collectively as pellets). The ore and reducing agent may be pulverized separately and then mixed before shaping into the pellets. The pellets are charged into a roaster and heated to a temperature ranging from 500° to 850° C by blowing a neutral or non-reducing heating gas containing oxygen in an amount of less than 1% by volume into the roaster to reduce most of the nickel, cobalt and copper and a small portion of the iron to the metallic state.

The neutral or non-reducing heating gas which contains oxygen in an amount of less than 1% by volume may be nitrogen, a synthetic gas, an inert gas or a combustion gas prepared by burning either liquid or gaseous fuels such as fuel oil, propane or the like with the amount of air therein controlled to adjust the amount of oxygen to less than 1% by volume. The air flow out of the system is prevented by maintaining the furnace under positive pressure.

The reducing gaseous atmosphere is formed in this step by means of the carbonaceous reducing agent in the pellets. Namely, when the pellets containing the carbonaceous reducing agent are heated, a reducing atmosphere is formed in the pellets and reducing gases such as hydrogen and carbon monoxide and the like are produced from the reducing agent and reduce the oxides of nickel, cobalt, copper, iron and manganese.

Accordingly, in the inner portion of the pellets, an inherent gaseous atmosphere of $CO$-$CO_2$-$H_2$-$H_2O$ is formed depending on the heating temperature, the time, and the type and amount of reducing agent.

Low-aged coal, for example, contains volatile matter ranging from 30 to 50% by weight and begins to generate decomposition gases at about 400° C. Coal generates decomposition gases in a volume ranging from 400 to 500 $m^3$/ton under a neutral atmosphere, the predominant portions of the decomposition gases comprising reducing gases such as hydrogen, carbon monoxide, methane and the like. The liberation of volatile matter is completed at a temperature lower than 900° C.

When bituminous coal is added in an amount of 10% by weight of manganese nodules which are comprised, by weight of 1.0% of Ni, 0.5% of Cu and 0.2% of Co, the total sum of $CO + H_2 + CH_4$ liberated at temperatures up to 800° C due to the volatile matter (decomposition gases) amounts to 30 to 40 m³/ton of ore. This corresponds to 3 to 4 times as much as the theoretical amount of reducing gas (about 9 m³) required for reducing the total amount of nickel, copper and cobalt in the ore to the metallic state. If effective use is made of the reducing gases liberated by the heat decomposition of volatile matter in the added reducing agent, the selective reduction can be achieved by adding bituminous coal in an amount less than 10% by weight of the ore. However, the manganese nodules also contain iron in an amount of about 15% by weight and manganese in an amount of about 25% by weight, the iron in the manganese nodules is contained mainly as geothite ($Fe_2O_3 \cdot H_2O$) and the manganese as todorokite [$3MnO_2 \cdot Mn(OH)_2 \cdot nH_2O$] or virnecite [$4MnO_2 \cdot Mn(OH)_2 \cdot nH_2O$]. Together with the reduction of nickel, copper and cobalt to the metallic state, there occurs the reduction of the iron and manganese constituents at least to $Fe_3O_4$, FeO, $Mn_2O_3$, $Mn_3O_4$ and MnO. For example, for manganese nodules containing iron in an amount of 15% by weight and manganese in an amount of 25% by weight, the reducing gases ($H_2 + CO$) are required for reducing the total contents of Fe and Mn to $Fe_3O_4$ and $Mn_3O_4$, respectively, in an amount of about 25 m³/ton of the ore, so that sufficient reduction cannot be achieved only by the heat decomposition gas. Hence the reduction requires reducing gases produced by water gas and Bourdoi reductions of the portion other than the volatile matter in the reducing agent (fixed carbon).

As is obvious from the preceding description, in order to reduce sufficiently nickel, copper, and cobalt, it is necessary to add a reducing agent containing volatile matter in a large amount to liberate heat decomposition gases and fixed carbon of high reactivity.

With respect to such reducing agents, reduction tests were widely conducted by employing various reducing agents having various fuel ratios. As a result, it has been found that in the selective reduction of manganese nodules it is necessary to employ carbonaceous reducing agents having a fuel ratio of less than 4 in order to inhibit the reduction of iron and manganese to metallic form while obtaining sufficient reduction efficiencies of nickel, copper and cobalt. The term "fuel ratio" as referred to herein is represented by the ratio of fixed carbon (% by weight)/volatile matter (heat decomposition gases; % by weight).

The treating temperature constitutes an important factor for the selective reduction of manganese nodules together with the liberating condition of reducing gases depending on the type of reducing agents. As noted previously, the selective reduction is intended to reduce preferentially nickel, copper and cobalt into metallic form. Since the reduction of Fe and Mn compounds, particularly Fe compounds which have less affinity with oxygen than Mn compounds, is enhanced to a larger extent at temperatures of higher than 800° C, it is difficult to obtain the reduced ore having sufficiently high selective reductivity with respect to manganese nodules at a temperature of higher than 850° C.

As mentioned above, the reduction of nickel, copper and cobalt in manganese nodules is considered to be effected by the heat decomposition gases from the carbonaceous reducing agents and reduced gases liberated by water gas and Bourdoi reactions of fixed carbon. Ordinarily, manganese nodules contain water of crystallization in an amount from 20 to 30%, which is liberated at temperatures from about 100° to 500° C. The water of crystallization is liberated violently at temperatures lower than 400° C, so that it is difficult to form a sufficiently reducing atmosphere in the inner portion of the pellets. Accordingly, the optimum temperature for the reduction of manganese nodules is higher than 500° C for liberating vigorously the decomposition gases from the reducing agent. Since nickel, copper and cobalt are contained in manganese nodules as their hydroxides, they are easily susceptible to reduction so that they can be treated at a temperature of 100° C lower than that for nickel-containing ores such as garnierite. Accordingly, the optimum reaction temperature ranges from 500° to 850° C in the treatment of manganese nodules by the selective reduction process.

It is necessary to maintain the oxygen content in the heating gas blown into the roaster in an amount of less than 1% by volume. When the oxygen content is higher than 1% by volume, sufficient reduction efficiency cannot be achieved for the nickel, copper and cobalt in the manganese nodules and the reduction tends to become difficult due to the deposition of fused ore in the roaster.

When manganese nodules comprising 25.3% of Mn, 10.3% of Fe, 1.06% of Ni, 0.14% of Co, 0.67% of Cu, 14% of $SiO_2$, 3.8% of $Al_2O_3$ and 2.6% of MgO in pellet form, and together with coal having a fuel ratio of 1.1 in an amount of 6% by weight of the ore were treated according to this selective reduction process at 650° C for 30 minutes, the reduction efficiency to metals was 98% for Ni, 98% for Cu, 90% for Co, 8% for Fe and 0% for Mn. On the other hand, when the same manganese nodules were treated by a gas reduction process such as a Nicaro process corresponding to a multi-hearth reducing roaster, the reduction efficiency to the metals was 94% for Ni, 96% for Cu, 75% for Co, 14% for Fe and 0% for Mn under the optimum treating conditions, and the reduction efficiency of iron was more than 25% under the treating conditions to make the reduction efficiency of cobalt to a value of more than 90%. As can be seen from the above, the process of the present invention for treating pellets containing coal is superior to gas reduction process such as the Nicaro process in selective reduction efficiency.

After manganese nodules have been roasted in order to obtain selective reduction, i.e. when roasted in the form of pellets together with a carbonaceous reducing agent having a fuel ratio of less than 4 as mentioned above by blowing neutral or non-reducing gases containing oxygen in an amount of less than 1% by volume or by blowing ordinary reducing gas, the resulting reduced ore is cooled and crushed, if necessary, and then followed by slurrying it in an aqueous ammoniacal solution, normally an aqueous ammonia containing ammonium carbonate. The slurry is then added with a water-soluble chloride such as NaCl or $NH_4Cl$ and treated with an oxygen-containing gas to dissolve the metallic nickel, copper and cobalt as their ammine complexes.

The cooling atmosphere for the reduced ore normally comprises oxidizing or inert gases such as $N_2$ gas.

In the case of cooling the reduced pellets which have been roasted with the above-mentioned carbonaceous reducing agent, (as compared with the selectively reduced ore in the form of a powder), the reduced pellets (which are still in the form of pellets) are kept in a condition where the reoxidation of metallic nickel, copper and cobalt does not to take place; thus the cooling may be carried out in combustion gas atmosphere containing oxygen in an amount of less than 1% by volume.

The reduced and cooled ore is charged into a quench tank and slurried in a liquid as such or, if necessary, by wet grinding the quenched ore. The liquid in the quench tank may be water or an aqueous ammoniacal solution. In the process of selective reduction-extraction with an aqueous ammoniacal solution of manganese nodules, the solid to liquid ratio in the slurry is preferably from 1:3 to 1:6. NaCl or $NH_4Cl$ is added to the quench tank and the slurry is subjected to aeration in a conventional manner as such when an aqueous ammoniacal solution is employed as the quenching liquid or after an aqueous ammoniacal solution is added to the water when water is employed as the quenching liquid to form the aqueous ammoniacal solution containing free oxygen, whereby extracting the metallic nickel, copper and cobalt. In this extraction, the metallic particles grow to a larger size and are dissolved at first by the aeration, and the dissolved nickel, copper and cobalt are converted to the ammine complexes whereas the dissolved iron is oxidized immediately and then hydrolyzed to the hydroxides to be removed from the system.

In conventional extraction processes for reducing ores with an aqueous ammoniacal solution without adding NaCl or $NH_4Cl$, there occurs a shortcoming in that the metallic nickel, copper and cobalt deposited as the microparticles by the reduction treatment at relatively lower temperatures have high activities and adsorb oxygen easily from the cooling gas atmosphere at lower temperatures, and when they are treated with an aqueous ammoniacal solution containing free oxygen, the surface of these metals adsorbs further oxygen and become deactivated, thereby making the extraction process of these metals difficult and slow.

On the other hand, in the extraction process using an aqueous ammoniacal solution together with NaCl or $NH_4Cl$ according to this invention, it is possible to improve the efficiency and speed of extracting of nickel, copper and cobalt by activating the metallic particles by the presence of $Cl^-$.

It has not been elucidated why such activation occurs by adding to the solution NaCl or $NH_4Cl$, but it is supposed that NaCl or $NH_4Cl$ accelerates the oxidation and hydrolysis of iron selectively among the dissolved metals. As a result, the oxygen potential decreases to some extent in the solution so that oxygen absorbed on the surface of the metal particles is dissolved into the solution more easily, resulting in an improvement in the efficiency and speed of extracting nickel, copper and cobalt.

Similar effects can be achieved by using other water-soluble chlorides other than NaCl or $NH_4Cl$ as an additive, but NaCl or $NH_4Cl$ is preferred in view of the conditions of extracting solution, including the fact that no contamination of the product should take place, that the solution should not cause environmental pollution when it flows into waste water and that the additives are available inexpensively. These water-soluble chlorides have a sufficient effect even when added in a small amount. Since significant increases in effects cannot be achieved by adding the additive in a larger amount as well as for economical reasons, the additive may be less than 3% by weight of the reduced ore.

As an example to illustrate the effect of the addition of a $Cl^-$ source in the extraction with ammoniacal solution, the following results were found for the selective reduction-extraction with an ammoniacal solution of pellets of manganese nodules containing on a weight basis 26.4% of Mn, 10.3% of Fe, 1.13% of Ni, 0.14% of Co and 0.62% of Cu and mixed with coal having a fuel ratio of 1.0 in an amount of 8% by weight of the ore.

In Test Run No. 1, the above-mentioned pellets were charged into a shaft kiln of a small capacity, while supplying a combustion gas of kerosene, and were treated at 700° C for 40 minutes (retention time) in a combustion gas containing oxygen in an amount of 0.5% by volume. The reduced pellets were cooled in a cooler in an argon stream to prevent any reoxidation to a temperature of 400° C and then quenched with water, followed by slurrying with an aqueous ammoniacal solution containing $NH_3$ in a concentration of 65 g/liter and $CO_2$ in a concentration of 35 g/liter. The slurry of reduced ore in the solution in a ratio by weight of 1:5 was added with NaCl in an amount of 0.2% by weight of the reduced ore and aeration started. Portions of slurry were sampled every at 0.5, 1, 2, 3 and 5 hours after the aeration, and the solution was separated from the solid to calculate the extraction efficiencies of nickel, copper and cobalt.

In comparative Run No. 2, the reduced pellets were slurried in a similar manner to test Run No. 1 and aerated except in the absence of the addition of a $Cl^-$ source (the NaCl).

| Extraction efficiencies of Ni, Cu and Co with respect to the extraction time, hours | | | | | | |
|---|---|---|---|---|---|---|
| Run No. | | 0.5 hrs | 1 hr | 2 hrs | 3 hrs | 5 hrs |
| 1 | Ni | 88 | 95 | 97 | 98 | 98 |
|   | Cu | 89 | 96 | 97 | 98 | 98 |
|   | Co | 77 | 83 | 87 | 89 | 90 |
| 2 | Ni | 57 | 76 | 85 | 90 | 94 |
|   | Cu | 55 | 77 | 88 | 92 | 95 |
|   | Co | 23 | 47 | 64 | 72 | 78 |

As shown in the above table, the extraction speeds of nickel, copper and cobalt could be improved markedly by adding NaCl to the extracting solution and marked improvement could be achieved within the economical extraction time. It should be noted that manganese nodules normally contain Cl, probably derived from adhered sea water, in an amount from 0.2 to 1.0%, but since such Cl has been removed or deactivated during the reduction roasting, it has a lower effect than that of $Cl^-$ sources added according to this invention.

This invention is characterized in that the aqueous ammoniacal solution obtained in the preceding extraction step and containing mainly the ammine complexes of nickel, copper and cobalt is then added thereto a $SO_2$ source and blown air to remove most portions of impurities such as iron and manganese by oxidizing and hydrolyzing. In the process for selective reduction-extraction of manganese nodules, nickel, copper and cobalt are dissolved in the leach solution as the ammine complexes and most of the metallic iron in the reduced ore is oxidized and hydrolyzed to be removed by the separation of the solution from the insoluble solid together with the extraction tailing, but a portion of iron is not oxidized and hydrolyzed and is retained in the leach solution in a dissolved state. The manganese content contained in manganese nodules in a large amount can be reduced not to the metal, but to MnO, $Mn_3O_4$ and $Mn_2O_3$ in the reduced ore during the selective reduction step. Such manganese oxides can be dissolved to some extent in the aqueous ammoniacal solution containing ammonium carbonate ($NH_3$ in a concentration from 3 to 10% and $CO_2$ in a concentration from 1 to 5%) employed in the extraction with ammoniacal solution. Most of dissolved manganese is oxidized and hydrolyzed by blowing air in the extraction step together with the dissolved iron but a portion of manganese is also retained in the leach solution. When ordinary manganese nodules are treated, the leach solution contains manganese in a concentration of 2.5 g/liter in the presence of nickel in a concentration of 10 g/liter. When copper and cobalt are to be recovered as the precipitate of sulfide, for example, by adding a sulfur source in a subsequent step, most of the manganese is precipitated as the sulfide, resulting in a severe disadvantage for the operation of fractional recovery of copper and cobalt. A portion of the manganese causes contamination of basic nickel carbonate in the ammonia stripping step.

As a conventional process for treating manganese nodules, a process for the selective reduction-extraction with an ammoniacal solution has been proposed, but there has been established no favorable process for separating manganese from the resulting solution in the conventional process.

In this invention, the leach solution containing iron and manganese as impurities has added thereto a $SO_2$-source and blown air therein to remove iron and manganese by oxidation and hydrolysis. The $SO_2$-source may be a sulfite reagent such as $Na_2SO_3$ which does not have an adverse effect on the subsequent steps as such, or an aqueous solution thereof, or $SO_2$ gas may be blown with air.

According to this process, no loss is incurred at all from the co-precipitation of the valuable metals of nickel, copper and cobalt to improve drastically the efficiencies of removal of iron and manganese. Under the optimum conditions, the Fe/Ni ratio can be reduced to a value of less than 0.0002 and the Mn/Ni ratio to a value of less than 0.0001 in the aqueous ammoniacal solution containing nickel, copper and cobalt after the treatment.

It has not yet been elucidated why iron and manganese can be removed as their hydroxides by adding a $SO_2$-source, but it is supposed that the $SO_2$-source enhances the oxidation and hydrolysis of Mn and Fe dissolved in the solution. Namely, Fe and Mn are supposed to form the ammine complexes similarly to nickel, cobalt and the like in the aqueous ammoniacal solution, but the ammine complexes of iron and manganese are unstable as compared to those of nickel, cobalt and the like. It is thus supposed that such unstable ammine complexes are decomposed easily by the actions of an $SO_2$-source, Cl ion added at the extraction of the reduced ore and blowing air to be susceptible to the oxidation and hydrolysis.

The $SO_2$-source has a sufficient effect in a small amount. When added in a larger amount, the addition is not only uneconomical but also results in a decrease in the removal efficiencies of iron and manganese, particularly that for manganese. The $SO_2$-source may be added in a concentration of lower than 2.5 g/liter of the solution calculated as $Na_2SO_3$.

As an example for treating the leach solution containing 10.3 g/liter of Ni, 6.5 g/liter of Cu, 1.3 g/liter of Co, 0.020 g/liter of Fe, 1.8 g/liter of Mn, 50 g/liter of $NH_3$, 28 g/liter of $CO_2$ and 0.8 g/liter of Cl and obtained by the extraction of selectively reduced ore with an ammoniacal solution by the above-mentioned process, the purification according to this invention will be illustrated. 1 Liter of the leach solution was added with 0.5 g of $Na_2SO_3$ and the mixture was blown with air at a rate of 500 ml/minute for 30 minutes while maintaining the mixture at 30° C. After the completion of aeration, the precipitate was separated and the solution was analyzed. The resulting solution contained 0.0020 g/liter of Fe and 0.0008 g/liter of Mn. The Fe/Ni ratio was less than 0.0002 and the Mn/Ni ratio was less than 0.0001. No co-precipitation of nickel, copper and cobalt occurred in the precipitate.

On the other hand, when the leach solution containing 10.3 g/liter of Ni, 6.2 g/liter of Cu, 1.2 g/liter of Co, 0.020 g/liter of Fe, 1.7 g/liter of Mn, 50 g/liter of $NH_3$ and 28 g/liter of $CO_2$ obtained by the extraction of selectively reduced ore with an aqueous ammoniacal solution without adding with a water-soluble chloride such as NaCl and the like was aerated without adding a $SO_2$-source such as $Na_2SO_3$ and the like, the treated solution contained 0.0090 g/liter of Fe and 0.20 g/liter of Mn even after aeration for 3 hours and cobalt was co-precipitated in an amount of about 10% by the vigorous aeration for a long time. Thus the stripping efficiencies of iron and manganese from the leach solution were poor.

The precipitate of hydroxides of iron and manganese obtained by the process for stripping iron and manganese is separated from the solution through a filter press to be usable as a raw material for preparing ferromanganese. Since the precipitate contains iron only in an amount of several percent with respect to Mn, it is usable as a raw material of ferromanganese having a high manganese quality level, but is generally usable as a raw material which contains nickel, copper and cobalt in very small amounts normally together with the extraction tailing residue obtained from the extraction step of selectively reduced ore of manganese nodules for the preparation of ferromanganese containing manganese in a high amount. The raw materials for the preparation of ferromanganese are dried, followed by sintering. The sintered product is charged in an electric furnace together with coke or anthracite to prepare ferromanganese. When manganese nodules contain iron in a high content, ferromanganese may be prepared after the stripping treatment of iron, for example, by preferentially reductive melting of Fe.

The aqueous ammoniacal solution obtained by the stripping process of iron and manganese and containing nickel, copper and cobalt (but no iron nor manganese) is treated by the following known procedure. The solution is added with a reagent such as $(NH_4)_2S$ and $Na_2S$ or a sulfiding agent such as $H_2S$ gas and the like to convert preferentially copper and cobalt to remove them from the solution.

Nickel, copper and cobalt in the aqueous ammoniacal solution are contained as the ammine complexes. When a sulfiding agent is added to the solution, copper is selectively precipitated as the sulfide precipitate corresponding to the equilibrium between the stabilities of the sulfides and ammine complexes, followed by precipitating cobalt as the sulfide precipitate. Accordingly, the separation of copper, cobalt and nickel from each other can be achieved depending on the treating conditions such as the amount of sulfiding agent added to the solution and the like. There may be carried out a process wherein after the separation of sulfides containing predominantly copper sulfide, the sulfides containing predominantly Co sulfide are separated. However, the strippings of copper and cobalt in this step can be selected depending on the treating method of the resulting sulfides. Although copper and cobalt can be selectively separated as their sulfides from nickel, such a theoretical separation is difficultly achieved in the actual practice. Copper sulfide and cobalt sulfide are composed of mixed sulfides of copper-cobalt-nickel containing predominantly each ingredient. Economical methods for treating such mixed sulfides have been developed which are suitable for each to recover copper, cobalt and nickel as the metals or oxides.

Nickel is then recovered from the aqueous ammoniacal solution containing only nickel by known procedures.

The most general method for recovering nickel from the aqueous ammonical solution is a procedure wherein the solution is blown by steam or warmed to remove $NH_3$ from the solution in the gaseous state together with a portion of $CO_2$ and to precipitate basic nickel carbonate which may be calcined into nickel oxide sinter and further reduced into metallic nickel. Alternatively, the solution or basic nickel carbonate may be reduced directly with hydrogen gas to obtain nickel metal.

This invention will be further illustrated by way of the following example.

EXAMPLE

Collected manganese nodules were washed with water to remove the adhered mud, dried and analyzed to obtain the following chemical composition:

| Chemical composition, % by weight of Mn nodules after maintained at 105° C | | | | | | | | |
|---|---|---|---|---|---|---|---|---|
| Mn | Fe | Ni | Co | Cu | $SiO_2$ | $Al_2O_3$ | MgO | Cl |
| 26.0 | 10.3 | 1.12 | 0.14 | 0.62 | 13.8 | 3.7 | 2.7 | 0.24 |

The Mn nodules were added with coal having a fuel ratio of 1.1 in an amount of 7% by weight of the ore and the mixture was pulverized to an extent of smaller than 28 mesh and mixed thoroughly. The resulting mixture was formed into the pellets having a diameter from 5 to 20 mm to be charged into a small shaft kiln having a capacity of about 1 kg of the feed from the top thereof. From the bottom thereof, hot gas obtained by the combustion of kerosene and containing $O_2$ in a concentration from 0.0 to 0.7% by volume was fed. The runs were carried out by changing the outlet temperature of the furnace from 550° to 750° C and the retention time in the kiln from 30 to 60 minutes. The reduced pellets were cooled to a temperature of from 100° to 400° C by falling down through a cooler of indirect cooling shaft type with water connected directly to the outlet of the kiln and then quenched directly in a water tank. A portion of the reduced ore was sampled after cooling from the sampling pipe equipped near the end of the cooler outlet. According to the reduction efficiency measured by the bromomethanol method, the samples over all treating ranges showed 96 to 98% for Ni, 96 to 99% for Cu, 89 to 92% for Co and 5 to 8% for Fe and no metallic Mn could be detected.

The reduced pellets quenched with water were pulverized to a size of smaller than 65 mesh by means of a wet mill, concentrated by means of thickeners to obtain a slurry of reduced ore containing 50% water. To the slurry was then added NaCl solution in a concentration of 50 g/liter in an amount of 25 ml (0.25% by weight of the reduced ore as NaCl) per kg of the slurry and further added were recycling solutions from the extraction step and washing step of residue operated subsequently to the extraction step and an aqueous ammoniacal solution containing ammonium carbonate to obtain the slurry of reduced ore and the aqueous ammoniacal solution. The solid to liquid ratio (i.e., weight of the reduced ore : weight of the solution) of the slurry was 1:6 and the concentration of $NH_3$ was 50 g/liter and that of $CO_2$ was 30 g/liter. The slurry was transferred into an agitated extraction tank by means of a pump and air introduced through aeration pipes at a flow rate of 3 liters/min. The apparent retention time of the slurry in the extraction tank was set to be 2 hours.

In order to increase the concentrations of Ni, Cu and Co in the leach solution to be fed to the recovery step of products, 2/3 of the leach solution from the extraction tank was recycled to the preceding step for preparing the slurry of reduced ore in the aqueous ammoniacal solution. The resulting leach solution contained 7.8 g/liter of Ni, 4.3 g/liter of Cu, 0.90 g/liter of Co, 0.035 g/liter of Fe and 1.6 g/liter of Mn. The overall yields taking into account losses in each step from the raw nodules to the leach solution was 96% for Ni, 97% for Cu and 90% for Co. It should be noted that it is possible that the concentrations in the leach solution can be increased by the treatment under more controlled conditions and that the overall yields can be increased by about 1% by establishing a more sufficient washing step.

The leach solution was transferred to a tank for stripping Fe and Mn and added with an aqueous solution containing 50 g/liter of $Na_2SO_3$ in an amount of 10 ml per liter of the leach solution followed by blowing air in a flow rate of 2 liters/min., while agitating the mixture. The apparent retention time of leach solution was 60 minutes. The precipitate formed was discharged together with the solution by means of a pump and separated from the solution through a filter press. The solution had a Fe/Ni ratio of less than 0.0001 and a Mn/Ni ratio of less than 0.0001 after the separation of precipitate. The Ni, Cu and Co contents in the precipitate were negligibly small.

The subsequent steps will be illustrated with reference to the attached flow sheet. The filtrate after the strippings of Fe and Mn was transferred to a tank for stripping Cu and Co and added with an aqueous solution of $Na_2S$ in a concentration of 100 g/liter in an amount of 60 ml per liter of the filtrate to be treated. The apparent retention time of the solution in the reaction tank was 30 minutes. The solution containing the resulting precipitate was withdrawn from the reaction tank by means of a pump and was separated from the solid by means of a filter press. The precipitate was fed to a secondary reaction tank to be washed with the solution containing Cu and Co supplied from the preceding step. In this washing treatment, no addition of the sulfide was effected but air was blown therein. By the secondary treatment, most of the Ni co-precipitated together with Cu and Co in the precipitate was redissolved to be mixed with the solution from the tank for stripping Fe and Mn.

The final solution was withdrawn from the primary reaction tank for stripping Cu and Co and separated from the precipitate by means of a filter press. It contained 6.9 g/liter of Ni, 0.02 g/liter of Co and 0.001 g/liter of Cu.

The final solution was preheated through a preheater and deammoniated by steaming in a still to prepare basic nickel carbonate. The removed $NH_3$ and $CO_2$ were recovered through an absorber to be recycled to the leaching step. The resulting basic nickel carbonate was concentrated through a filter press, dried and roasted by combining with coal to obtain the oxide sinter comprising Ni oxide containing metallic Ni by the partial reduction of oxide. The tailing from the washing step, i.e., the residue after the washing of extraction residue and the precipitate from the step for stripping Fe and Mn were mixed to obtain a raw material for preparing ferromanganese. The mixture was analyzed to contain 43% of Mn and 16% of Fe and added with a Mn ore in a small amount or treated for stripping Fe, followed by subjecting to test for preparing ferromanganese by means of an electric furnace to obtain high carbon ferromanganese containing Mn in an amount of higher than 80%.

What we claim is:
1. In a process for recovering the metal impurities contained in manganese nodules which contain nickel, copper, cobalt, iron and manganese compounds which includes the steps of:
 1. reducing the manganese nodules so as to convert the nickel, copper and cobalt to their metallic states while inhibiting the conversion of iron and manganese into their metallic state, thereby producing a reduced ore;
 2. slurrying said reduced ore in a liquid selected from the group consisting of water or an aqueous ammoniacal solution;
 3. adding said slurry to an aqueous ammoniacal solution and then blowing air into said solution;
 4. adding a water-soluble chloride to said solution of (3) to form a leach solution, said compound being used in an amount of less than 3% by weight of the reduced ore; the improvement wherein after step (4) the following steps are conducted:
 5. adding an $SO_2$-containing compound to said leach solution in order to help remove the manganese and iron impurities;
 6. blowing air into said leach solution: and
 7. removing the iron and manganese precipitates from said leach solution of step (6) in order to recover a solid useful for the preparation of ferromanganese.

2. A process as claimed in claim 1 wherein said water-soluble chloride of step (4) is NaCl.

3. A process as claimed in claim 1 wherein said water-soluble chloride of step (4) is $NH_4Cl$.

4. A process as claimed in claim 1 wherein said $SO_2$-containing compound of step (5) is added in an amount of less than 2.5 grams per liter of said aqueous ammoniacal solution calculated as $Na_2SO_3$.

5. A process as claimed in claim 4 wherein the $SO_2$-containing compound of step (5) is added as a solid to the leach solution.

6. A process as claimed in claim 4 wherein the $SO_2$-containing compound of step (5) is added as a solution to the leach solution.

7. A process as claimed in claim 4 wherein the $SO_2$-containing compound of step (5) is $SO_2$ gas and is blown together with the air of step (6) into the leach solution.

8. A process as claimed in claim 1 wherein step (1) is conducted at a temperature ranging from 500° to 850° C.

9. A process as claimed in claim 8 wherein said step (1) is conducted in the presence of a heating gas which contains oxygen in an amount of less than 1% by volume.

10. A process as claimed in claim 1, wherein said reducing in step (1) comprises mixing the manganese nodules with a carbonaceous reducing agent having a ratio of fixed carbon to volatile matter of less than 4, contacting said mixture with a heating gas which contains less than 1% oxygen by volume, and heating said mixture to between 500° and 850° C.

11. A process as claimed in claim 10 wherein between said mixing of said manganese nodules with said carbonaceous reducing agent and said contacting therewith with a heating gas, said mixture is pulverized to a particle size of less than 20 mesh and then shaped into pellets or briquets.

12. A process as claimed in claim 11, wherein said carbonaceous reducing agent comprises bituminous coal.

13. A process as claimed in claim 1, wherein said iron and manganese in step (7) are in the form of hydroxides and are removed from the leach solution by passing said leach solution through a filter press.

14. A process according to claim 1, wherein step (6) is conducted at 30° C.

* * * * *